US005477270A

United States Patent [19]

Park

[11] Patent Number: 5,477,270
[45] Date of Patent: Dec. 19, 1995

[54] DISTANCE-ADAPTIVE MICROPHONE FOR VIDEO CAMERA

[75] Inventor: Won-bok Park, Suwon, Rep. of Korea

[73] Assignee: Samsung Electronics Co., Ltd., Kyungki, Rep. of Korea

[21] Appl. No.: 194,372

[22] Filed: Feb. 8, 1994

[30] Foreign Application Priority Data

Feb. 8, 1993 [KR] Rep. of Korea ............ 93-1591

[51] Int. Cl.$^6$ ................................................ H04N 5/228
[52] U.S. Cl. ........................... 348/222; 358/906; 381/92
[58] Field of Search .................... 348/222, 20, 240; 381/26, 92, 120, 122; 358/906; H04N 5/228

[56] References Cited

U.S. PATENT DOCUMENTS 4,807,051  2/1989  Ogura ........................... 381/122
4,984,087  1/1991  Fujimura et al. ................ 348/222

FOREIGN PATENT DOCUMENTS 6113391A  4/1994  Japan ............................ 381/26

Primary Examiner—James J. Groody
Assistant Examiner—Jeffrey S. Murrell
Attorney, Agent, or Firm—Sughrue, Mion, Zinn, Macpeak & Seas

[57] ABSTRACT

A camcorder includes a camera section receiving a subject image subject through a zoom lens, converting the subject image to a video signal and generating a corresponding wide/tele signal representing position of the zoom lens, an audio processing part including a plurality of microphones receiving input sounds from the subject and converting the input sounds into a recordable audio signal, and a recorder/reproducer which records and reproduces the video signal and the recordable audio signal onto video tape. The audio processing part includes a plurality of analog elements. The audio processing part continuously amplifies the input audio signal using the analog elements in response to the wide/tele signal and outputs the recordable audio signal which corresponds to perceived distance from the camcorder to the subject. The analog elements may be transistors, wherein the dynamic resistance of each transistor is continuously varied responsive to the wide/tele signal.

10 Claims, 4 Drawing Sheets

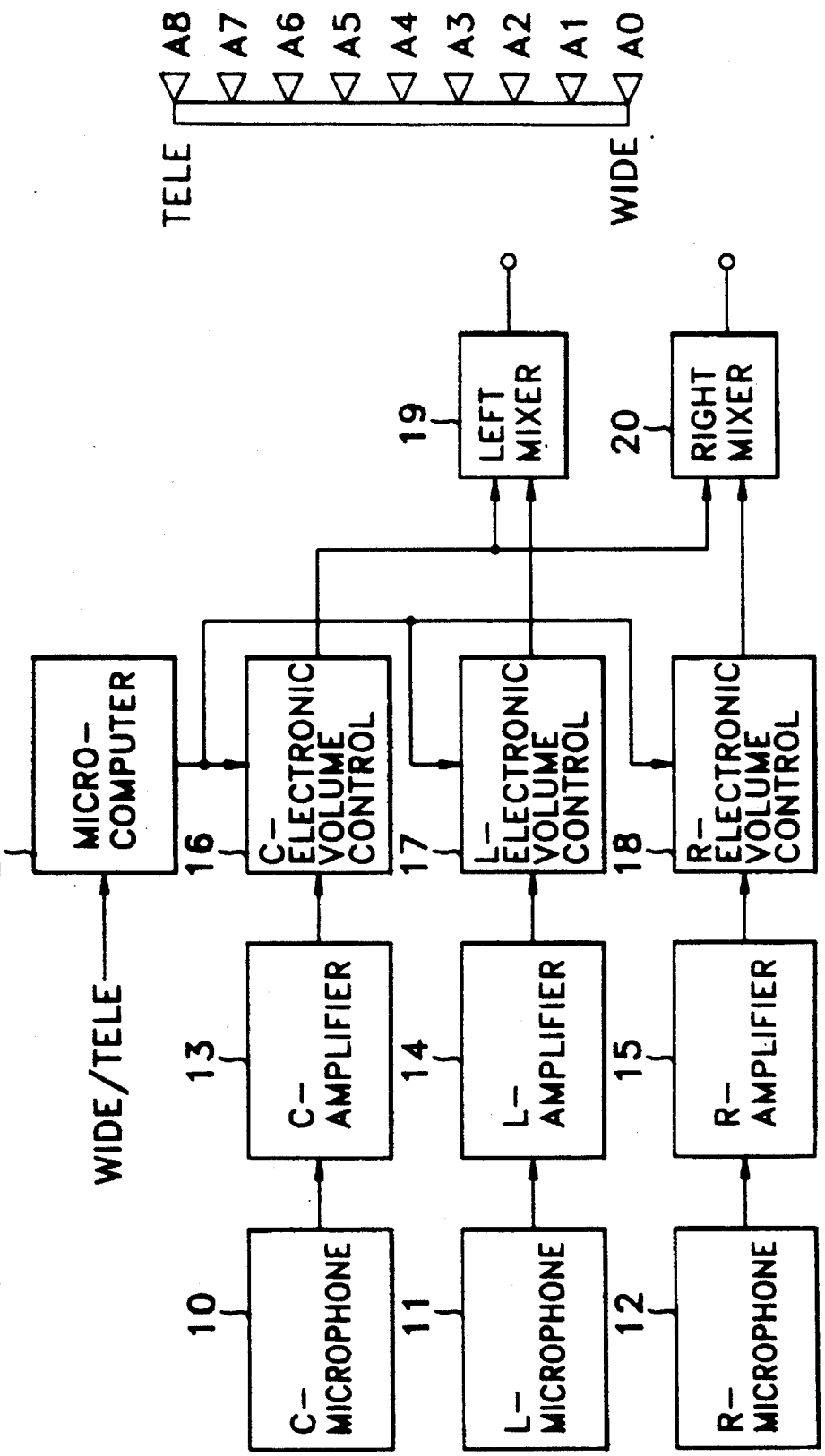

DISTANCE-ADAPTIVE MICROPHONE FOR VIDEO CAMERA

BACKGROUND OF THE INVENTION

1. Field of the Invention

The present invention relates to a sound receiving microphone for a video camera which produces sounds corresponding to the image in the camera and, more particularly, to a sound receiving microphone which provides a sound quality similar to the natural sound by analog audio signal processing.

Korean Patent Application No. 93-1591 is incorporated herein by reference for all purposes.

2. Brief Description of the Prior Art

Generally, in the video camera and recorder (camcorder) purchased by the average consumer for simultaneously recording an image and a sound, the image part of the camcorder includes an optical lens with a zoom function, which lens selectively produces a life-like video image for recording. However, the audio section of the camcorder consists of a general purpose microphone which lacks the capability to produce a life-like sound level. Accordingly, the viewer's visual and aural perception become mismatched since the visual distance from a camcorder to the subject changes for the image while the sound does not change in correspondence with a change in image size, i.e., with the change in apparent distance between the subject and the camcorder.

In order to overcome this problem, camcorders including a function wherein the audio amplitude changes in proportion to the change in magnification of the zoom lens, i.e., a sound receiving function having a unified image and sound qualities, have been proposed. FIG. 1 is a block diagram showing the sound-receiving microphone of the video camera employing conventional digital audio signal processing.

Referring to FIG. 1, the conventional microphone includes a central (C) microphone 10, a left (L) microphone 11, a right (R) microphone 12, a central amplifier 13, a left amplifier 14, a right amplifier 15, a central electronic volume control 16, a left electronic volume control 17, a right electronic volume control 18, a microcomputer 21, a left mixer 19, and a right mixer 20.

In an attempt to produce a life-like audio output, audio signals input from the left, right and center microphones 10, 11 and 12 are first amplified in C-, L- and R-amplifiers 13, 14 and 15, and the respective output signals are input to respective electronic volume controls 16, 17 and 18. It will be appreciated that the outputs of amplifiers 13, 14, and 15 are adjusted appropriately in C-, L- and R-electronic volume controls 16, 17 and 18 in accordance with a control signal produced by microcomputer 21 and the respective volume-controlled signals are, in turn, provided to L- and R- mixers 19 and 20. Left mixer 19 adds the output of C-electronic volume control 16 to that of L-electronic volume control 17, and amplifies the result. Right mixer 20 adds the output of C-electronic volume control 16 to that of R-electronic volume control 18, and amplifies the result.

It will be noted that microcomputer 21 receives a wide/tele signal, which signal changes depending on the position of the zoom lens in the camera section (not shown), and microcomputer 21 outputs the control signal according to wide/tele signal so as to represent the distance from the sound source. Therefore, the outputs of amplifiers 13, 14 and 15 are input to the relevant electronic volume controls 16, 17 and 18, and are adjusted according to the control signal. Thus, for a wide/tele signal corresponding to the position of the zoom lens in a video part (a camera section which is not shown) of the camcorder, the detected position is indicated by a direct current (DC) voltage and is applied from a camera section (not shown) to microcomputer 21, after being divided into eight steps, i.e., eight steps ranging from A1 to A8 volts.

FIG. 2 shows an embodiment of translating the wide/tele signal into eight steps according to the position of the conventional zoom lens. The output voltage, having one of eight steps and producing a change in the electronic volume associated with the recorded image, can be represented as shown in Table 1.

TABLE 1

| Zoom Lens Position | Voltage (Volts DC) | VOLUME (in dB) | | |
|---|---|---|---|---|
| | | Left | Right | Center |
| A0 | 0.0 | 0 | 0 | +1 |
| A1 | 0.6 | −2 | −2 | +3 |
| A2 | 1.1 | −4 | −4 | +5 |
| . | . | . | . | . |
| A8 | 3.2 | −20 | −20 | +15 |

It will be noted that the zoom lens position is divided into eight steps from A1 to A8 depending on the distance, gradually increasing from A0, i.e., the reference and nearest point from the camera, to A8, as shown in FIG. 2. The corresponding wide/tele voltage varies in steps, e.g., 0, 0.6, 1.1 ... 3.2 volts DC depending on the position of the zoom lens, which then results in the discontinuous change in L and R electronic volume controls 17 and 18, e.g., 0, −2, −4, .. . −20 dB and an attendant discontinuous change in C-electronic volume control 16, e.g., 1, 3, 5 ... 15 dB. The central audio input signal is increased when the position of the zoom lens in FIG. 2 goes from "wide" to "tele" (which means that the distance received to the subject is shortened) while the level of central audio input signal is decreased when the position of the zoom lens in FIG. 2 goes from "tele" to "wide" (which means that the distance to the subject is decreased). For example, the human voice is loud when the position of the zoom lens goes from "wide" to "tele" and is soft when the position of the zoom lens goes from "tele" to "wide". Since the value of the electronic volume method is fixed to eight discrete steps, e.g., the sound feels discontinuous when the sound changes to match a change in lens position. In addition, since the microcomputer 21 is needed for control of the electronic volume operation, the manufacturing cost of the camcorder is high.

SUMMARY OF THE INVENTION

The principal purpose of the present invention is to provide a sound receiving microphone for a camcorder whose sound is varied smoothly in conjunction with operation of a zoom lens control.

Another object according to the present invention is to provide a sound receiving microphone system which smoothly varies an output sound characteristic proportional to zoom lens position. According to one aspect of the invention, the sound receiving microphone system employs analog audio processing circuits.

Still another object according to the present invention is to provide a sound receiving microphone system which smoothly varies an output sound characteristic proportional to zoom lens position wherein the system can be provided at low cost.

Yet another object of the present invention is to provide a sound receiving microphone system which smoothly varies an output sound characteristic proportional to zoom lens position wherein the system can be provided using low cost parts.

Another object of the present invention is to provide a camcorder including a sound receiving microphone system.

These and other objects, features and advantages according to the present invention are provided by a sound receiving microphone, which provides a life-like sound stereophonically in response to a wide/tele signal produced by a video camera, the wide/tele signal changing according to the position of a zoom lens. The sound receiving microphone advantageously includes a plurality of microphones converting received respective sounds from a subject into corresponding electrical signals permitting amplification, a plurality of sound receiving circuits which continuously change the respective amplified electrical signals output from the microphones in response to the wide/tele signal, using the dynamic resistance of respective transistors, and a plurality of sound mixers, each of which sums and amplifies selected outputs of selected ones of the sound receiving circuits.

These and other objects, features and advantages according to the present invention are provided by a camcorder including a camera section receiving a subject image subject through an optical lens, converting the subject image to a video signal and generating wide/tele signal representing position of the optical lens, an audio processing part including a plurality of microphones receiving input sounds from the subject and converting the input sounds into a recordable audio signal, wherein the audio processing part continuously amplifies the input audio signal according to the wide/tele signal using the dynamic resistance of the transistor, and outputs the recordable audio signal which corresponds to the distance of the received image and a recorder/reproducer which records and reproduces the video signal and the recordable audio signal onto video tape.

These and other objects, features and advantages of the invention are disclosed in or are apparent from the following description of preferred embodiments.

BRIEF DESCRIPTION OF THE DRAWINGS

The above objects and other advantages of the present invention will become more apparent from the detailed description of preferred embodiments thereof taken with reference to the attached drawings, in which:

FIG. 1 is block diagram showing the sound receiving microphone according to the conventional digital method;

FIG. 2 is a schematic diagram illustrating detection of a wide/tele signal in eight steps according to the position of the conventional zoom lens;

DETAILED DESCRIPTION OF THE PREFERRED EMBODIMENTS

The present invention will be described below in more detail with reference to the attached drawings.

Figure 3:
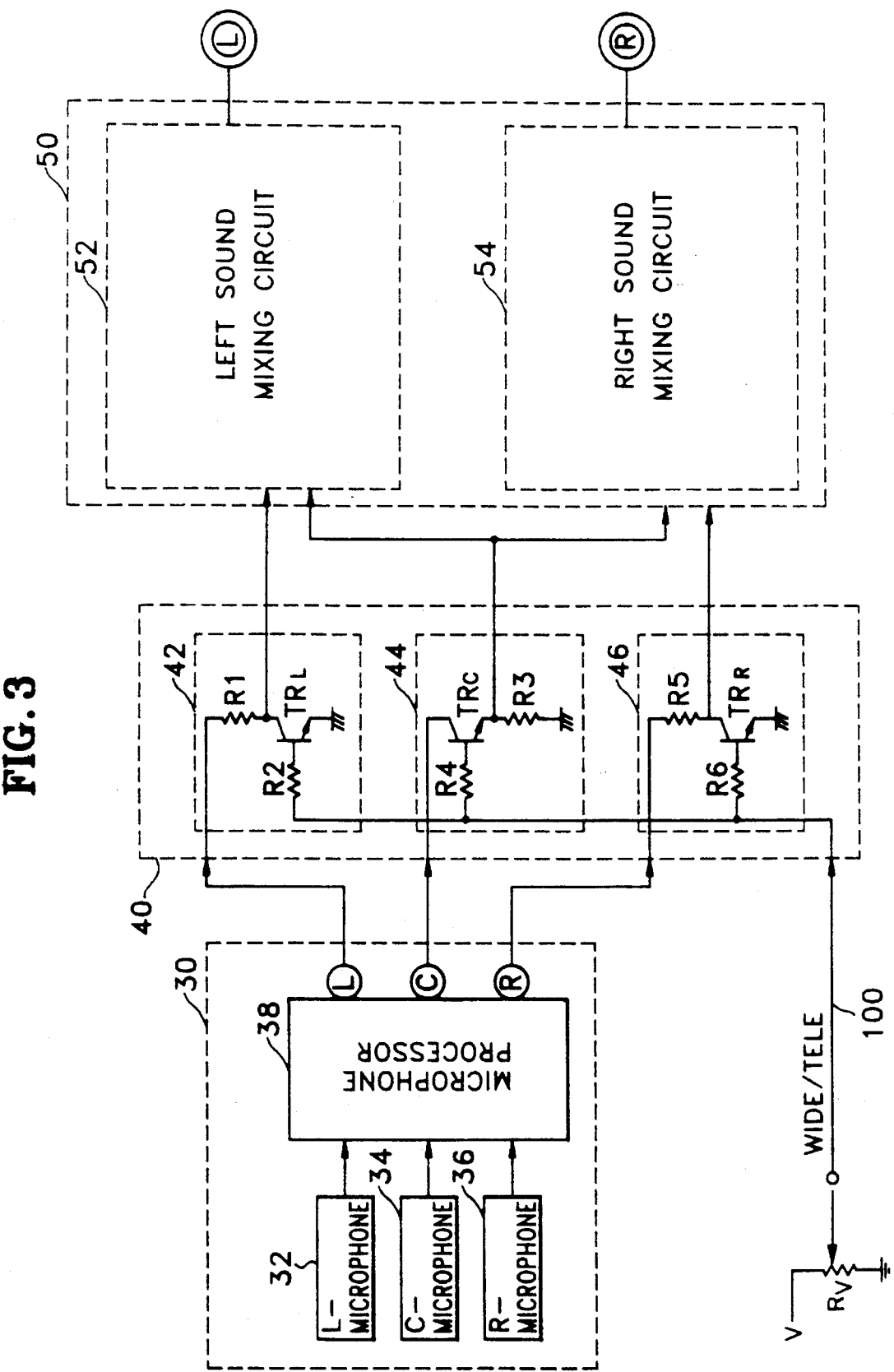
FIG. 3 is a circuit diagram showing a sound receiving microphone according to analog signal processing of the present invention.

FIG. 3 is a circuit diagram which schematically shows the sound receiving microphone of the present invention, wherein the device of the present invention comprises a microphone 30, an analog sound receiver 40 and a sound mixer 50. Microphone 30 is made up of a central microphone 34, a left microphone 32, a right microphone 36 and a microphone processor 38. Analog sound receiver 40 is made up of a left sound receiving circuit 42, a central sound receiving circuit 44 and a right sound receiving circuit 46. Sound mixer 50 is made up of a left sound mixing circuit 52 and a right sound mixing circuit 54.

Thus, the microphone consists of L microphone 32, R microphone 36 and C microphone 34, which enables the sound to be input and converted into an electrical sound signal (audio signal). Also, the audio signal which is input from microphones 32, 34 and 36 is amplified by microphone processor 38, which then is output to analog sound receiver 40. Sound receiving circuits 42, 44 and 46 of analog sound receiver 40 receive a wide/tele signal generated from a camera section (not shown) through a terminal 100.

The wide/tele signal is a DC voltage which continuously changes according to the position of the zoom lens of the camera section. That is, the DC voltage corresponding to the wide/tele signal is increased when the subject comes closer to the screen, i.e., when the position of the zoom lens goes from "wide" to "tele", while the DC voltage of wide/tele signal is decreased when the subject goes away from the screen, i.e., when the position of the zoom lens goes from "tele" to "wide". It will be appreciated that the continuously variable wide/tele signal advantageously can be generated, in an exemplary case, by a variable resistor, as illustrated in FIG. 3. Other circuitry and techniques for generating a suitable wide/tele signal will occur to those of ordinary skill in the art. Thus, modifications to the preferred embodiments may be made without departing from the spirit and scope of the invention.

The DC voltage of wide/tele signal is input to the respective bases of transistors $TR_L$, $TR_R$ and $TR_C$ of sound receiving circuits 42, 44 and 46. Sound receiver 40 changes the amplitude of audio signals which are input from respective microphones according to wide/tele signal voltage and gives a life-like quality to the sound considering the image of the external environment. That is, the central audio output signal is increased as the position of the zoom lens of the camera section moves from "wide" to "tele" since the subject comes closer to the screen. On the contrary, the central audio input signal becomes small as the position of the zoom lens of the camera section moves from "tele" to "wide" since the subject goes far from the screen. For example, a voice of the person in front is loud when the position of the zoom lens goes from "wide" to "tele" and is soft when the position of the zoom lens goes from "tele" to "wide".

Left mixing circuit 52 sums the output of central sound receiving circuit 44 with the output of left sound receiving circuit 42, and amplifies and outputs this sum. Right mixing circuit 54 sums the output of central sound receiving circuit 44 with the output of right sound receiving circuit 46, and amplifies and outputs this sum.

Figure 4:
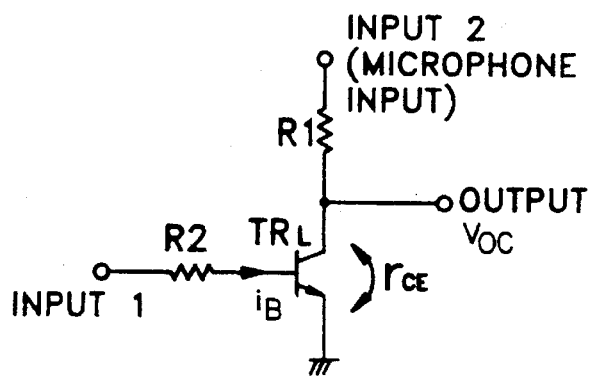
FIG. 4 is a detailed circuit diagram showing the left sound receiving circuit of FIG. 3.

FIG. 4 is a detailed circuit diagram showing the left sound receiving circuit of FIG. 3. Since the structure and operation of the left sound receiving circuit and the right sound receiving circuit are similar, only the left sound receiving circuit will be explained. Referring to FIG. 4, the left sound receiving circuit consists of transistor $TR_L$, resistor R2, which is connected to the base of transistor $TR_L$, and resistor R1, which is connected to the collector of transistor $TR_L$. Referring to FIG. 4, $r_{CE}$ is the dynamic resistance between the collector and the emitter of the transistor. The wide/tele signal is input from a camera section to a first input terminal, which then is input to the base of transistor $TR_L$ through resistor R2. The wide/tele signal is a DC voltage signal which changes continuously according to the change of the position of the zoom lens.

When the DC voltage is input to the base of transistor $TR_L$, a base input current $i_B$ is also changed according to the input DC voltage. Meanwhile, the audio signal is input to a second input terminal from microphone processor 38, which then is connected to the collector of transistor $TR_L$ through resistor R1. Accordingly, when the current $i_B$, which is input to the base of transistor $TR_L$ increases, the output of transistor $TR_L$ decreases inversely proportional to the increase of the input current $i_B$, since the resistance value $r_{CE}$, i.e., $TR_L$'s own dynamic resistance value, decreases. Here, the output voltage ($V_{OL}$) can be calculated according to the following expression:

$$V_{OL} = \left( \frac{r_{CE}}{R_1 + r_{CE}} \right) \text{Input2} \quad (1)$$

Here, $r_{CE}$ is a dynamic resistance of the transistor itself. Output voltage signal ($V_{OL}$) decreases as the dynamic resistance $r_{CE}$ decreases, as shown in expression (1). Accordingly, when the zoom lens goes from "wide" to "tele", the output voltage signal ($V_{OL}$) decreases because the input current $i_B$ increases in accordance with the increase of the DC voltage value of the wide/tele signal.

Figure 5:
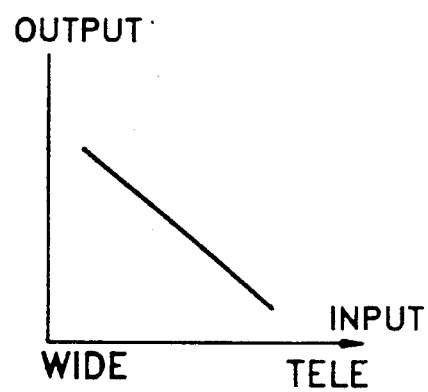
FIG. 5 is a graphical representation showing the characteristic of the output according to the input current of the left sound receiving circuit of FIG. 4.

FIG. 5 is a graphical representation showing the relationship between the input current $i_B$ and output voltage signal ($V_{OL}$) according to the left sound receiving circuit of FIG. 4, wherein the traverse axis indicates an input current $i_B$ signal and the vertical axis indicates an output voltage signal ($V_{OL}$). Referring to the graph of FIG. 5, input current $i_B$ increases as the zoom lens goes from "wide" to "tele", while output voltage signal ($V_{OL}$) decreases as input current $i_B$ increases.

Figure 6:
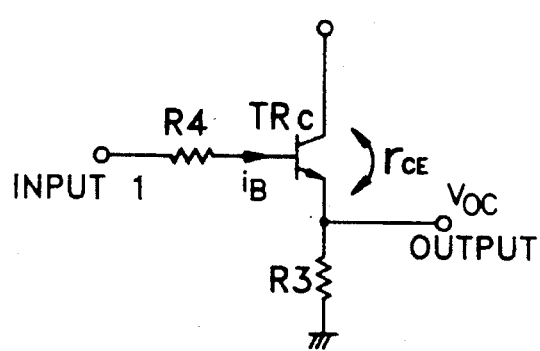
FIG. 6 is a detailed circuit diagram showing the central sound receiving circuit of FIG. 3.

FIG. 6 is a detailed circuit diagram showing the central sound receiving circuit of FIG. 3. Referring to FIG. 6, the central sound receiving circuit is made of a transistor $TR_C$, a resistor R4 connected to the base of transistor $TR_C$, and a resistor R3 connected to the emitter of transistor $TR_C$. The wide/tele signal is input from a camera section to a first input terminal, which then is input to the base of transistor $TR_C$ through resistor R4. The wide/tele signal is a DC voltage signal which changes continuously in accordance with the change of the position of the zoom lens. When the DC voltage is input to the base of transistor $TR_C$, current $i_B$ input to the base is also changed. Meanwhile, the central audio signal is input to a second input terminal from microphone processor 38. Accordingly, when the current $i_B$ input to the base of transistor $TR_C$ increases, the output of transistor $TR_C$ increases in proportion to the increase of the input current $i_B$, since the $r_{CE}$ value, i.e., transistor $TR_C$'s own dynamic resistance value, decreases. Here, the output voltage ($V_{OC}$) can be calculated as the following expression:

$$V_{OC} = \left( \frac{R_3}{R_3 + r_{CE}} \right) \text{Input2} \quad (2)$$

As shown in expression (2), when input current $i_B$ increases, output voltage ($V_{OC}$) also increases while dynamic resistance $r_{CE}$ decreases. Accordingly, when the zoom lens goes from "wide" to "tele", the DC voltage of the wide/tele signal increases, thereby increasing input current $i_B$ and output voltage ($V_{OC}$).

Figure 7:
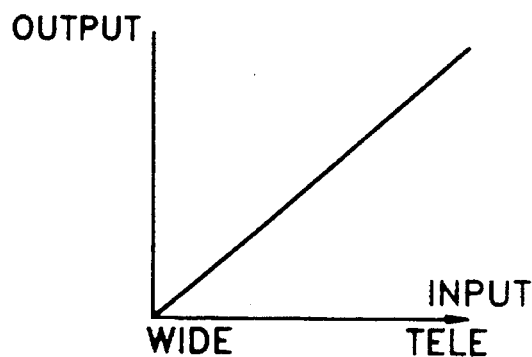
FIG. 7 is a graphical representation showing the characteristic of the output according to the input current of the central sound receiving circuit of FIG. 6.

FIG. 7 is a graphical representation showing the relationship between the output voltage ($V_{OC}$) according to the input current of the central sound receiving circuit of FIG. 6, wherein the traverse axis indicates input current $i_B$ signal and the vertical axis indicates the output voltage ($V_{OC}$) signal. Referring to the graph of FIG. 7, input current $i_B$ increases as the zoom lens goes from "wide" to "tele", while output voltage ($V_{OC}$) signal increases in proportion to the increase of input current $i_B$.

Figure 8:
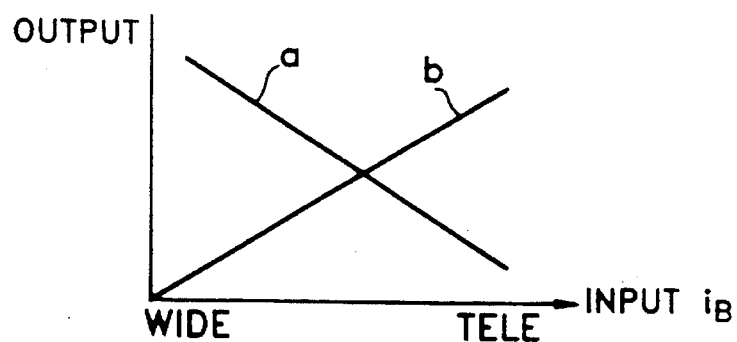
FIG. 8 is a graphical representation showing the combined input/output characteristic of the left and right sound receiving circuit of FIG. 5 and the central sound receiving circuit of FIG. 7.

FIG. 8, which combines FIG. 5 and FIG. 7 is a graphical representation showing the relationship wherein the left and right sound receiving and central sound receiving circuits change depending on input current $i_B$.

Referring to FIG. 8, the traverse axis indicates input current $i_B$ while the vertical axis indicates output voltage signal. Input current $i_B$ increases as the zoom lens goes from "wide" to "tele". When input current $i_B$ increases, output of the left and right sound receiving circuits decreases as shown in graph 'a', while output of the central sound receiving circuit increases as shown in graph 'b'. On the contrary, when the zoom lens goes from "tele" to "wide", input current $i_B$ decreases, and then output of the left and right sound receiving circuits increases as shown in graph 'a', while output of the central sound receiving circuit decreases as shown in graph 'b'. Accordingly, when the zoom lens goes from "wide" to "tele" which means that the subject is coming closer, the voice input from the left and right microphones decreases while the voice input from the central microphone increases. As a result, the voice generated in the front is heard louder and louder while the voice generated from the side is heard softer and softer, which gives an effect of having a conformity with an image. Preferably, when the zoom lens goes from "tele" to "wide", which means that the subject gradually looks further away, the voice input from the left and right microphones is heard louder while the voice input from the central microphone is heard softer.

Figure 9:
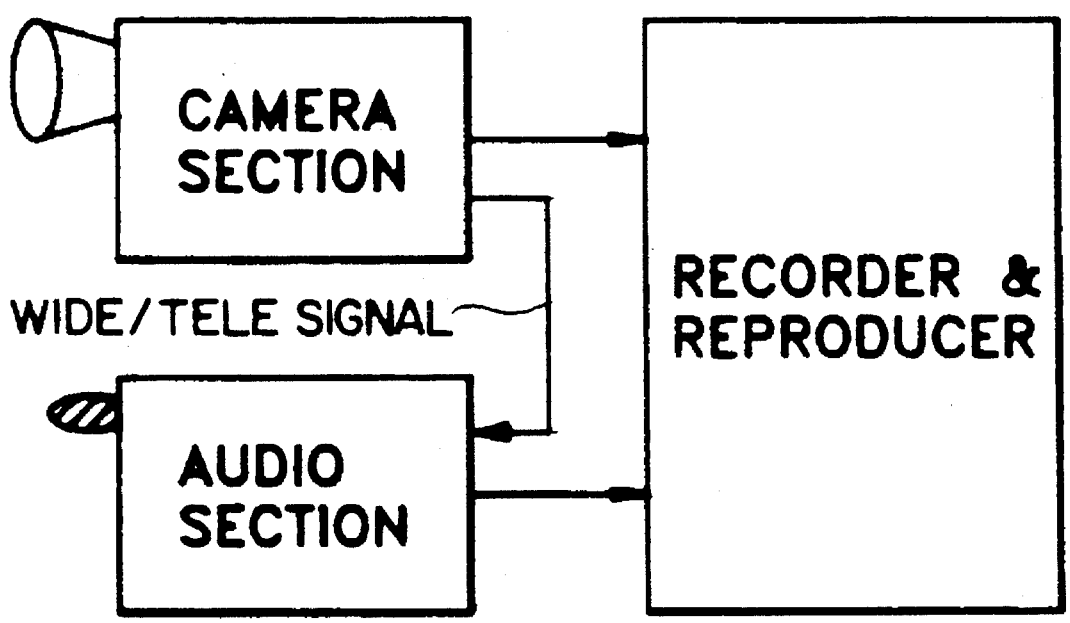
FIG. 9 is a schematic diagram showing the structure of the camcorder according to another embodiment of the present invention.

FIG. 9 is a schematic illustration showing the structure of the camcorder of another embodiment of the present invention, wherein a camera section 80, audio section 82 and a recorder/reproducer 84 are provided. Referring to FIG. 9, the camera section 80 and recorder/reproducer 84 are the same as those in the conventional device, and the audio section 82 is provided with a sound receiving microphone of the present invention as described in FIG. 3. That is, the camera section 80 picks up the subject through an optical lens and converts the picked-up subject into a video signal and generates the wide/tele signal in accordance with zoom lens position. The audio section 82 inputs the sound of the subject into a number of microphones and converts the input sound into an audio signal, and then performs an analog processing on the audio signal according to the wide/tele signal, and then outputs the audio signal that accords to the distance of the received image. The recorder/reproducer 84 inputs the video and audio signals and records and reproduces them on the video tape.

The device of the present invention uses the sound receiver of an analog method, which enables the natural connection of the change of the sound. Also, the construction of a simple circuit utilizing the dynamic resistance characteristic of the transistor enables lowering the number of parts and the cost.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A sound receiving microphone for a video camera generating a wide/tele signal which changes according to a zoom lens position which provides a life-like sound in response to the wide/tele signal, said sound receiving microphone comprising:

a plurality of microphones converting sounds from a subject into a respective electric signals and amplifying said electrical signals to thereby produce respective amplified signals;

a plurality of analog sound receiving circuits, each of said circuits receiving one of said respective amplified signals and generating a respective attenuated signal based on dynamic resistance of a respective transistor and said wide/tele signal; and a plurality of sound mixers, each of said mixers receiving, summing and amplifying selected ones of said attenuated signals.

2. The sound receiving microphone of video camera according to claim 1, wherein said microphones comprise:

a left microphone receiving a left sound;

a right microphone receiving a right sound;

a central microphone receiving a central sound; and a microphone processor which generates said respective amplified signals.

3. The sound receiving microphone of video camera according to claim 1, wherein said analog sound receiving circuits comprise:

a central sound receiving circuit which continuously changes a selected center amplified signal corresponding to a central audio signal received by said microphones in proportion to change of said wide/tele signal;

a left sound receiving circuit which continuously changes a selected left amplified signal corresponding to a left audio signal received by said microphones inversely proportional to the change of said wide/tele signal; and a right sound receiving circuit which continuously changes a selected right amplified signal corresponding to a right audio signal received by said microphones inversely proportional to the change of said wide/tele signal.

4. The sound receiving microphone according to claim 1, wherein said sound mixers comprise a left sound mixer and a right sound mixer, where each of said left and right sound mixers commonly receives one of said respective attenuated signals corresponding to a central sound received by said microphones.

5. A sound receiving microphone for a video camera generating a wide/tele signal which changes according to a zoom lens position which provides a life-like sound in response to the wide/tele signal, said sound receiving microphone comprising:

a plurality of microphones converting sounds from a subject into an respective electric signals and amplifying said electrical signals to thereby produce respective amplified signals, said microphones comprising:

a left microphone receiving a left sound;

a right microphone receiving a right sound;

a central microphone receiving a central sound; and a microphone processor which generates said respective amplified signals;

a plurality of analog sound receiving circuits, each of said circuits receiving one of said respective amplified signals and generating a respective attenuated signal based on dynamic resistance of a respective transistor and said wide/tele signal, said analog sound receiving circuits comprising:

a central sound receiving circuit which continuously changes a selected center amplified signal corresponding to a central audio signal received by said microphones in proportion to change of said wide/tele signal to produce a central attenuated signal;

a left sound receiving circuit which continuously changes a selected left amplified signal corresponding to a left audio signal received by said microphones inversely proportional to the change of said wide/tele signal to produce a left attenuated signal; and a right sound receiving circuit which continuously changes a selected right amplified signal corresponding to a right audio signal received by said microphones inversely proportional to the change of said wide/tele signal to produce a right attenuated signal; and a plurality of sound mixers, each of said mixers receiving, summing and amplifying selected ones of said attenuated signals, each of said mixers receiving said central attenuated signal.

6. A camcorder comprising:

a camera section receiving an image of a subject through an optical system including a zoom lens, converting the subject image into a video signal and generating a wide/tele signal in accordance with position of said zoom lens;

an audio processing part receiving input sounds from said subject at a plurality of microphones and converting the input sounds into respective audio signals, continuously amplifying said audio signals according to both said wide/tele signal and dynamic resistance of respective transistors and generating a final audio signal which corresponds to the perceived distance between said subject and said optical system; and a recorder/reproducer which records and reproduces said video signal and said final audio signal on video tape.

7. A sound receiving microphone for a video camera generating a wide/tele signal which changes according to a zoom lens position which provides a life-like sound in response to the wide/tele signal, said sound receiving microphone comprising:

microphone means for converting sounds from a subject into a plurality of electric signals and for amplifying said electrical signals to thereby produce respective amplified signals;

analog sound receiving means for receiving a respective one of said amplified signals and for generating a corresponding attenuated signal based on dynamic resistance of a respective included transistor and said wide/tele signal; and mixing means for receiving, for summing and for amplifying selected ones of said attenuated signals.

8. The sound receiving microphone of video camera according to claim 7, wherein said microphone means comprises:

a left microphone receiving a left sound;

a right microphone receiving a right sound;

a central microphone receiving a central sound; and a microphone processor which generates said respective amplified signals.

9. The sound receiving microphone of video camera according to claim 7, wherein said receiving means comprises:

a central sound receiving circuit which continuously changes a selected center amplified signal corresponding to a central audio signal received by said microphone means in proportion to change of said wide/tele signal;

a left sound receiving circuit which continuously changes a selected left amplified signal corresponding to a left audio signal received by said microphone means inversely proportional to the change of said wide/tele signal; and a right sound receiving circuit which continuously changes a selected right amplified signal corresponding to a right audio signal received by said microphone means inversely proportional to the change of said wide/tele signal.

10. The sound receiving microphone according to claim 7, wherein said mixing means comprises:

a left sound mixer; and a right sound mixer, wherein each of said left and right sound mixers commonly receives one of said respective attenuated signals corresponding to a central sound received by said microphone means.

* * * * *